(12) United States Patent
Nair et al.

(10) Patent No.: US 8,751,861 B2
(45) Date of Patent: Jun. 10, 2014

(54) SYSTEM AND METHOD FOR IMPROVED REBUILD IN RAID

(75) Inventors: Naman Nair, Milpitas, CA (US); Khai M. Le, Norcross, GA (US)

(73) Assignee: LSI Corporation, San Jose, CA (US)

( * ) Notice: Subject to any disclaimer, the term of this patent is extended or adjusted under 35 U.S.C. 154(b) by 296 days.

(21) Appl. No.: 13/368,725

(22) Filed: Feb. 8, 2012

(65) Prior Publication Data
US 2013/0205166 A1 Aug. 8, 2013

(51) Int. Cl.
*G06F 11/00* (2006.01)

(52) U.S. Cl.
USPC ........................................ 714/6.21; 714/6.22

(58) Field of Classification Search
CPC ............ G06F 11/1008; G06F 11/1662; G06F 11/1092; G06F 11/1088; G06F 11/1076; H04L 49/90
USPC ......................................... 714/6.2, 6.21, 6.22
See application file for complete search history.

(56) References Cited

U.S. PATENT DOCUMENTS

| | | | | |
|---|---|---|---|---|
| 5,313,626 A | * | 5/1994 | Jones et al. | 714/5.11 |
| 5,822,584 A | * | 10/1998 | Thompson et al. | 718/103 |
| 5,941,993 A | * | 8/1999 | Tanaka et al. | 714/6.12 |
| RE36,846 E | * | 8/2000 | Ng et al. | 714/6.12 |
| 6,516,425 B1 | * | 2/2003 | Belhadj et al. | 714/6.12 |
| 6,647,514 B1 | | 11/2003 | Umberger et al. | |
| 7,765,553 B2 | * | 7/2010 | Douceur et al. | 718/107 |
| 7,979,635 B2 | * | 7/2011 | Bates et al. | 711/114 |
| 2004/0059958 A1 | * | 3/2004 | Umberger et al. | 714/5 |
| 2004/0230742 A1 | | 11/2004 | Ikeuchi et al. | |
| 2005/0102552 A1 | * | 5/2005 | Horn | 714/6 |
| 2007/0101187 A1 | * | 5/2007 | Daikokuya et al. | 714/6 |
| 2009/0210618 A1 | | 8/2009 | Bates et al. | |
| 2012/0066449 A1 | * | 3/2012 | Colgrove et al. | 711/114 |

FOREIGN PATENT DOCUMENTS

EP 0 519 670 A2 A2 12/1992

* cited by examiner

*Primary Examiner* — Marc Duncan
(74) *Attorney, Agent, or Firm* — Suiter Swantz pc llo

(57) ABSTRACT

The present disclosure is a system and method for improved RAID rebuilds under host IO conditions, that greatly improves rebuild times and prevents host IO starvation. A queue in a drive that is part of the RAID is used to store rebuild and host IO requests, with rebuild IOs issued to the head of the drive queue. Rebuild requests in the drive are delayed by a delay time. This delay ensures there is no unintended side effect of this invention that may result in host IO starvation for the RAID system. Delay is computed as a heuristic function from a plurality of variables, such as disk head response times, time allotted for rebuild, number of rebuild threads, drive behavior, rebuild IO profile, host IO profile including workload and locality, and a timeline of sequenced events, which in one preferred embodiment cycles every 70 seconds.

17 Claims, 3 Drawing Sheets

SYSTEM AND METHOD FOR IMPROVED REBUILD IN RAID

CROSS-REFERENCE TO RELATED APPLICATIONS

None

BACKGROUND OF THE INVENTION

1. Field of Invention

The present invention relates generally to rebuilds in the field of RAID (Redundant Array of Independent Disks).

2. Description of Related Art

The present invention relates generally to RAID. RAID is a storage technology that combines multiple disk drive components into a logical unit, a form of virtualization, primarily in order to reduce errors caused by disk failure, in particular in a network. Data is broken up into blocks stored on several disks in a sequential manner known as data striping. Often a parity block will form a means of checking for errors and reconstructing data in the event of a failure of one of the disk drives, forming parity redundancy.

Properly configured, RAID produces several benefits. RAID benefits include higher data security via redundancy (save RAID 0 configurations), fault tolerance, improved access to data (data availability), increased integrated capacity for creating large amounts of contiguous disk space, and improved performance. RAID costs include more expensive hardware and specialized maintenance requirements.

There are many types of RAID, especially if one includes hybrid (nested) RAID systems, however, RAID Levels 0-6 successfully define all typical data mapping and protection schemes for disk-based storage systems. Other classification systems for RAID include failure-resistant (systems that protect against data loss due to drive failure), failure-tolerant (systems that protect against loss of data access due to failure of any single or multiple component), and disaster-tolerant (systems that consist of two or more independent zones, either of which provides access to stored data).

Some popular RAID Levels include RAID 0, RAID 5 and RAID 6. RAID 0 is block-Level striping without parity or mirroring, with zero redundancy. It provides improved performance and additional storage but no fault tolerance. In RAID 0, blocks are written to their respective drives simultaneously on the same sector, which smaller sections of the data to be read off each drive in parallel, increasing bandwidth. RAID 0 does not implement error checking, so any error is uncorrectable. RAID 0 is often used in hybrid RAID systems to increase performance. RAID 5 is block-level striping with distributed parity, with the parity distributed along with the data and all but one drive are present for use, with the one drive being in reserve in the event of a single drive failure. In the event of a single drive failure, the array is not destroyed and any subsequent reads of data can be calculated from the distributed parity such that the drive failure is masked from the end user. A single drive failure however results in reduced performance of the entire array until the failed drive has been replaced and the associated data rebuilt. RAID 6 is block-level striping with double distributed parity and provides fault tolerance of two drive failures. The array continues to operate with even up to two failed drives. The advantage of RAID 6 is that it makes larger RAID groups more feasible, which is important as large-capacity drives lengthen the time needed to recover to rebuild and recover from the failure of a single drive.

Copyback is the replacement of a functioning array member disk by another member, by copying the disk contents to the replacement disk. Copyback is often used to replace a failing component, before it fails and degrades the array or restore a particular physical configuration for an array and is accomplished without reduction of the array.

Secondary memory stored in traditional spindle-based hard drives has a number of rotating disk platters storing data read by a magnetic head held by an armature. Modern drives typically have several heads and platters. For a single I/O operation to complete the armature must move the head to the sector in a platter track that holds data, a process called seeking, that has a seek time to complete, and wait for the desired sectors to rotate under the head, with the time it takes for this wait called rotational latency. These times and any delays caused by firmware, software or other hardware comprise the drive response.

IOPS (Input/Output Operations Per Second, pronounced eye-ops) is a common performance measurement used to benchmark computer storage devices like hard disk drives (HDD) and storage area networks (SAN). IOPS numbers published by storage device manufacturers do not guarantee real-world application performance IOPS can be measured with applications, such as Iometer (originally developed by Intel). The specific number of IOPS possible in any system configuration will vary greatly, depending upon various variables, including the balance of read and write operations, the mix of sequential and random access patterns, the number of worker threads and queue depth, as well as the data block sizes, as well as other factors the system configuration, storage drivers, OS background operations and the like.

When a RAID array has one or more hard drives fail, they have to be rebuilt. The IO operations that constitute rebuilding are rebuild IOs while the IO operations that are for ordinary non-rebuild operations, such as normal operation of the hard drives in the RAID group, are host IOs. In a RAID system, rebuild performance under host IO conditions is severely impacted. This occurs because rebuild operation requires a read of all remaining disks in the disk group, and each disk has to seek to service the rebuild operation. Add to this that each drive model has its own method to optimize its IO queue, often this method being proprietary, and reorders the IOs to minimize drive seeks. As a result, the rebuild IOs are severely impacted and suffer high latency, as they are usually the ones that get reordered most. This directly affects the rebuild performance, and the system can take 8-30 days to rebuild a mere 1 TB of data. Such Long rebuild times further exposes the RAID group to prolonged periods of degraded host IO performance, and opens the group to secondary or tertiary drive failures that can take the whole RAID group offline, with the potential loss of data.

All RAID systems typically have many IO queues managed and controlled by a controller, and each drive has its own IO queue as well. The present invention concerns itself with the latter, the queue within an individual drive, which may be 32 or 64 commands deep. Often, rebuild IOs suffer large latency or response times, because these IOs typically do not share the same locality or geographic presence with the rest host IO in the drive queue, with locality defined as a common region or cluster of sectors on the disk that are grouped so that the drive heads do not have to seek very far to get from one LBA (Logical Block Address) to the next, thus there can arise adverse effects during rebuild IOs. As rebuild operation results in the complete drive to be read to reconstruct data, for most of the rebuild operation the rebuild IOs will not share locality with the host IOs. ALL systems typically control the rate of rebuild IOs and host IOs to a drive, but once they are handed over to the drive, the drive takes over, and, as explained herein, the drive may skew the rates computed by the RAID controller, resulting in rebuild IO starvation.

Drives can be rebuilt in a series of one or more concurrent threads or processes, which are implementation dependent and decided by the firmware in a RAID system, based on available system resources and the granularity of the IO size of the disk group, as for example the stripe size of a virtual group being rebuilt.

The present invention addresses this concern of high latency of rebuild IOs resulting in prolonged rebuild times with a novel heuristic method of rebuilding while continuing to service host IO operations.

SUMMARY OF THE INVENTION

Accordingly, an aspect of the present invention is to provide a method that greatly improves the rebuild times, in a deterministic manner, by preventing high latency of rebuild IOs when a RAID Level storage system is being rebuilt under host IO conditions, so that the system is rebuilding and simultaneously operating as normal or traditional, as when not rebuilding.

Another aspect of the present invention is to issue IOs related to rebuild operations under host IO conditions, with a head-of-queue SCSI tag.

Another aspect of the present invention is to control the rate of rebuilds so that host IO starvation does not occur. A heuristic method ensures that the rate of rebuild is correctly controlled and continually adjusted to provide an optimal rebuild rate, while ensuring that host IOs are served per user request and no IO starvation occurs.

Yet another aspect of the present invention is to deliberately introduce delay into the rebuild queue by the firmware employed by a RAID storage system, which controls the rebuild rate. Delay may be computed as a heuristic function of disk head response times, time allotted for rebuild, number of rebuild threads, and a timeline of sequenced events, which in one preferred embodiment cycles every 70 seconds. Drive behavior, host IO profile including workload and locality of host IOs and rebuild IOs are critical factors that influence the drive's re-ordering algorithm and cause rebuild IO Latency. These are factored into the heuristic algorithm, by measuring the average latency of rebuild IOs.

Another aspect of the present invention is for a user-selected or configurable rebuild rate that can be optionally presented in a menu of options, e.g., "no impact", "Low impact", "high impact" or "max. impact" for how fast the rebuilds will occur vis-a-vis the host IOs and how the rebuilds will impact host IO operations.

Yet another aspect of the present invention is a heuristic rebuild that constantly recalibrates itself to adapt to any hardware. In one preferred embodiment the method of the present invention repeats every 70 seconds.

In certain configurations under heavy host IO conditions, the rebuild times employing the method and apparatus of the present invention can be improved by up to a factor of ten.

Thus, the present disclosure is a system and method for improved RAID rebuilds under host IO conditions, that greatly improves rebuild times and prevents host IO starvation. A queue in a drive that is part of the RAID is used to store rebuild and host IO requests, with rebuild IOs issued to the head of the drive queue. Rebuild requests in the drive are delayed by a delay time. This delay ensures there is no unintended side effect of this invention that may result in host IO starvation for the RAID system. Delay is computed as a heuristic function from a plurality of variables, such as disk head response times, time allotted for rebuild, number of rebuild threads, drive behavior, rebuild IO profile, host IO profile including workload and locality, and a timeline of sequenced events, which in one preferred embodiment cycles every 70 seconds. The rebuild IO profile has a rebuild rate presented as a plurality of options, e.g., "no impact", "low impact", "high impact" or "max. impact" for how fast the rebuilds will occur vis-a-vis the host IOs and how the rebuilds will impact host IO operations. In certain configurations under heavy host IO conditions, the rebuild times employing the method and apparatus of the present invention can be improved by up to a factor of ten.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
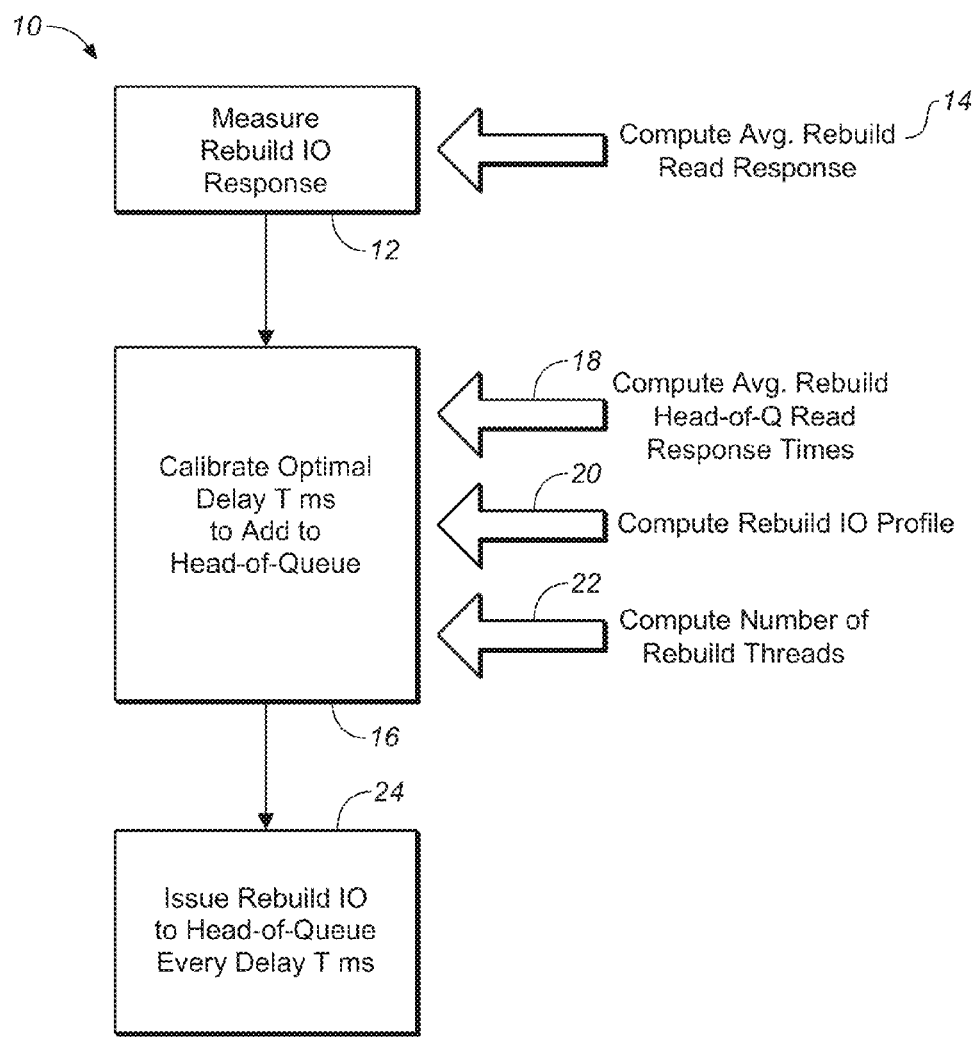
FIG. 1 is a flowchart showing the general overall flow of the present invention.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention may be any hardwire or software programmed device (e.g., an ASIC, or programmable logic device (PLD) such as an FPGA) to perform the functions outlined herein, the hardware running firmware, or hardware running software, with the software existing in memory. Further, the term "firmware" as used herein is shorthand and may be replaced by, and is synonymous with, any combination of hardware and/or software, such as an ASIC, PLD, controller, processor or computer system, including computer readable media storing a computer program that contains instructions to operate any computer or software programmable device, taken in combination with the device. When the present invention is executed by a computer system, the computer system typically has one or more processors, primary and secondary memory cooperating with the processor(s), which executes instructions stored in the memory, input/output means such as monitor, mouse and keyboard, and any necessary specialized hardware or firmware. Any software used to construct the present invention may have, in source code or machine language, any number of classes, functions, subroutines, objects, variables, templates, module(s), lines of code, portions of code and constructs (collectively and generally, and as depicted by the flowcharts herein, "a process step", "step", "process", "block", "block step", "application", "instructions", "program instructions", or "module") to carry out the invention in successive stages as described and taught herein, and may be either a standalone software application, or employed inside of or called by another software application.

Some portions of the detailed descriptions are presented in terms of processes, procedures, logic blocks, functional blocks, and other symbolic representations of operations on data bits, data streams, or waveforms within a computer, processor, controller, and/or memory. A process, procedure, box, logic block, functional blocks, operation, and the like, described herein, is generally considered to include physical manipulations of physical quantities, that may take the form of electrical, magnetic, optical, or any other signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

Regarding the invention, as discussed further herein, rebuilds in the traditional sense are subject to high latency due to drive queue re-ordering, as discussed. The solution as taught herein is to issue the rebuild IO with a SCSI IO Tag Head-of-Q, which puts the IO at the head of the drive's queue, and forces it to execute that IO. This reduces the rebuild latency drastically, and therefore dramatically improves rebuild performance. IO must be issued using a SCSI IO tag head-of-queue, preferably in the front of the queue rather than elsewhere. While this solution solves the problem of high latency, it leads to a secondary problem. First, if one is too aggressive with rebuild requests at the head-of-queue, then rebuild runs very fast, but the rest of the system is starved to the point of being dead. So to solve this first problem one introduces delay to the queue as taught herein. However, delay creates its own problems. If one uses a fixed, static delay, one does not get the best results under all conditions and with varying conditions and results, as rebuilds still take a day or two. Therefore delay has to be calculated in an optimal fashion, as taught herein, rather relying on a fixed, static value for delay. Optimal delay is based on a heuristic method, as taught herein, that covers many variables and works in many conditions. The user of the RAID simply dials in their comfort level for host IO impact, and the system as taught herein takes care of the rest. Delay is not improving performance in and of itself, rather, it is a must to ensure the system has minimal acceptable performance, and rebuilds are still running fast enough as taught herein. Without delay as taught herein, rebuilds would run very fast, but system performance would be very bad, as explained further below.

Turning attention to FIG. 1, there is shown a flowchart showing the general overall flow of the present invention for a RAID system deploying the present invention when a RAID Level system is being rebuilt under host IO conditions, so that the system is rebuilding in a heuristic manner. Generally the flow of the program 10 embodying the present invention has three steps. The present invention may reside in firmware, hardware, software or any combination thereof (hereinafter "firmware" for short).

In the first step 12, in the box Labeled "Measure Rebuild IO Response", the program computes the average rebuild IO response times, in order to base a solution. For example, the program can read the response time of the hard drive's heads reading data during a normal rebuild, or a "traditional" rebuild, that is, a rebuild using traditional techniques not involving the present invention, and compute an average response time in milliseconds (ms). Hence the input 14 which reads "Compute Avg. Rebuild Read Response". The average rebuild response time in effect measures the host workload, locality, and a drive's queue management efficiency at any given point in time. As described herein, if the average rebuild response time is below a certain empirically determined threshold value, the traditional rebuild mechanism of the prior art is sufficiently fast for the rebuild, otherwise if the threshold is exceeded, the rebuild commands go to the head (front) of the RAID drive's queue for immediate processing, for better rebuild performance.

In the second step 16, in the box labeled "Calibrate Optimal Delay T ms to add to the Head-of-Queue", the program computes in a heuristic manner the optimal delay T, in milliseconds (ms), in which to delay issuance of a rebuild IO to the drive queue. This Head-of-Queue (head of queue) queue is the queue for an individual drive in the individual drive's firmware as implemented by the drive vendor. During this step the RAID system is performing rebuilds in a non-traditional manner, as taught by this invention, involving inter alia a queue. The queue tells the RAID system which IO request to process and in what sequence (in a queue form), such as a host IO followed by a rebuild IO, or rebuild IO followed by a host IO, or two rebuild IOs followed by a host IO and the like. The head-of-queue-tagged rebuild IO tells the drive to immediately process the rebuild IO, before it goes back to processing/re-ordering the drive queue. The delay T is time in which a delay (in milliseconds) is made before rebuild IOs are issued to the drive queue. During this delay or pause, no rebuild IOs are issued to the head or front of the queue. This pause allows the drive to execute the queue, and prevents head-of-queue rebuild IOs from effectively taking over the drive while starving the rest of the queue.

Factors in step 16 in FIG. 1 that go into the computation of how much optimal delay time is needed, or delay calibration, to delay a rebuild IO command or rebuild IO from being issued to the front of a drive's queue, include several factors.

A first factor comprises the average rebuild read response time for the hard drive heads reading data during the head-of-queue rebuilds involving the queue. This is indicated in the input 18 which reads "Compute Avg. Rebuild Head-of-Q Read Response Times".

A second factor that goes into the delay calibration in step 16 is the computation of time allotted for rebuild from a preferably user-selected or configurable Rebuild IO Profile, indicated in the input 20 which reads "Compute Rebuild IO Profile". The Rebuild Profile has a number of rebuild rates that determines how aggressive the rebuild is to proceed. The Rebuild Profile may also be seen as the time allotted for rebuild compared to the total time. In one embodiment as taught further herein, a user can select a profile from a series of menu choices, from a minimum rebuild rate, such as a low impact rebuild ("Low"), where the rebuild IOs are not given as much priority, and the host IO requests have greater priority, or the user can select a high impact rebuild ("High") where equal priority is given to rebuild IO requests, or a maximum impact rebuild ("Max"), where rebuild IOs are given the greatest or higher priority over host IOs. The selection may also be done automatically. However, such gradations are implementation dependent and any number of step gradations or even a continuous smooth function, from zero or a minimum value, to a maximum value, may be employed in the Rebuild Profile. Further, the Rebuild Profile rates and time allotted can be automatically determined without user input, or automatically and in conjunction with user input. For instance the Rebuild Profile rates and allotted time may be automatically found from a lookup table using historical data, as in an expert system, to determine the profile based on historical data collected from numerous similar storage systems and/or for a particular hard drive manufacturer.

A third factor that goes into determining the delay during the delay calibration in step 16 is computing the number of rebuild threads, which is implementation dependent for any particular hard drive manufacturer, indicated in the input 22 in FIG. 1 which reads "Compute Number of Rebuild Threads". Drives can be rebuilt in a series of one or more threads of data as decided by the firmware in a RAID system, based on available system resources and the granularity of the IO size of the disk group, as for example the stripe size of a virtual group being rebuilt. For example for a 1 Meg strip size virtual drive, only one thread may be issued at a time, as each IO to a disk requires cache to be used. But a 64K stripe size virtual drive may have eight threads running, as eight such IOs will still only use 512K of cache per disk. ALL of this is known per se and is an implementation dependent variable.

A fourth factor that goes into the delay calibration in step 16 is the use of one or more time constants for the length of time allowed for rebuild, which in one embodiment is 1000 ms for an IO response, but in general can be any number based on a particular implementation. Further, the period of the entire method of practicing the invention is another time constant, and in one embodiment is 70 seconds long, as described further herein, but in general can be any length period, without loss of generality.

The third and final step 24 is the box labeled "Issue Rebuild IO to Head-of-Queue Every Delay T ms", where the program of the present invention actually implements the delay that has been computed in the previous step, by having the firmware of the present invention delay issuing a rebuild IO command to the front of the queue ("Head-of-Queue"), with the delay of duration T ms, as such delay was determined by the second step, step 16. During this delay there is no rebuild IO sent to the queue.

Using the technique of FIG. 1, there is a noticeable increase in performance during rebuilds in RAID system employing the present invention. To demonstrate the effectiveness, a simulation is shown in Tables A and B below. In some instances a 10 fold increase in performance has been shown. In Table A, the rebuild proceeds in accordance with the present invention, while Table B shows a rebuild under a traditional rebuild scheme.

TABLE A rebuild using the present invention - Head of Queue
Rebuild IOPS and response times (ms) 64K

| NUM | HOST IO | IOPS | AVG. RESP (ms) | MB/S |
|---|---|---|---|---|
| 1 | No IO | 220 | 2-40 | 13.74 |
| 2 | 1 QD near | 156 | 4 | 9.74 |
| 3 | 1 QD far | 146 | 9 | 9.12 |
| 4 | 16 QD near | 140 | 10 | 8.74 |
| 5 | 16 QD far | 130 | 17 | 8.12 |
| 6 | 256 QD near | 128 | 16 | 7.99 |
| 7 | 256 QD far | 123 | 20 | 7.68 |

TABLE B rebuild without using the present invention -
Rebuild IOPS and response times (ms) 64K

| NUM | HOST IO | IOPS | AVG. RESP (ms) | MB/S |
|---|---|---|---|---|
| 1 | No IO | 1398 | 0 | 87.29 |
| 2 | 1 QD near | 540 | 4 | 33.72 |
| 3 | 1 QD far | 422 | 12 | 26.35 |
| 4 | 16 QD near | 102 | 77 | 6.37 |
| 5 | 16 QD far | 106 | 80 | 6.62 |
| 6 | 256 QD near | 11 | 1200 | 0.69 |
| 7 | 256 QD far | 90 | 97 | 5.62 |

The key to the tables is as follows: "Num" in column 1 refers to a case number under consideration, with seven examples shown in each table. In the second column, "HOST IO", "near" as a suffix refers to a rebuild region closer to the host region. This has been found to be a rebuild region that suffers higher latency more so than the "far" region, as designated by the suffix in the second column, which is a rebuild region much further away from the host region, under heavy host IO workload, row 6 of table B. As many manufacturers have proprietary methods to optimize IO queues that are firmware dependent, a universal reason for this near and far phenomena cannot be definitively given, but it has been observed. In the second column, "Host IO" is the designated Host IO that is responding to an IO request, with the following designations: QD refers to Queue Depth, a measure of how many host IOs are present during the host IO request. "1QD" designates a very light host IO drive reordering scheme that is not really causing any impact to the overall system. With only 1QD a drive IO queue has only one host IO, and can be filled with many rebuild IOs. By contrast, 16QD is more of a typical host IO workload, with 16 IOs outstanding at a given time. The opposite extreme to 1QD is 256QD, which has many host IOs outstanding at a given time and a heavy workload; 256 QD is atypical, but causes the worst rebuild times.

In the third column, "IOPS" is the Input/Output rebuild Operations Per Second (IOPS). In the fourth column, "Avg Resp" is the average response of the drive in milliseconds (ms) for rebuild IOs. In the final column, "MB/s" is the data transfer rate throughput in megabytes per second (MB/s) for the rebuild IOs.

As can be seen from comparing Table A to Table B, the use of the present invention results in markedly increased performance compared to traditional rebuilds. For example, in row number "Num 5", for a moderate load of 16QD far, the response times for a traditional rebuild is high, at 80 ms. Using the techniques of the present invention however, in the same row the response time is decreased by 79%, from 80 ms to 17 ms, while IPOS and throughput is increased 23% from 106 to 130 and 6.62 to 8.12 MB/s, respectively.

Likewise, for a heavy load, such as 256QDfar shown in row number "Num 7", performance increases when using the techniques of the present invention compared to a traditional rebuild, as IOPS goes from 90 to 123, an increase of 37%, as does throughput, increasing from 5.62 to 7.68 MB/s, while average response drops from 97 to a more favorable 20, a decrease of 79%.

There are no benefits to using the present invention for light IO Load, which the present invention recognizes and incorporates into its method of operation, as explained further herein. For instance, comparing no rebuild IOs in row "Num 1" in Table A vs. Table B shows no benefit, and in fact performs worse, to using the techniques of the present invention; likewise, for row "Num 2" for 1QDnear there is no benefit to using the present invention compared to a traditional rebuild (for Table A for row "Num 2" a minimum delay of 50 ms was added between Head-of-Q rebuild requests). However for row "Num3" there is a slight benefit for 1QDfar in using the present invention in the response time, decreasing from 12 ms to 9 ms, but no advantage in the throughput, with the traditional rebuild having a higher throughput of 26.35 MB/s vs. 9.12 MB/s using the techniques of the present invention. Also as can be seen that within each table "near" conditions are typically faster than "far" conditions, but with a big exception: in Table B, for a traditional rebuild, higher latency occurs in a dramatic fashion for a heavy load such as "256QDnear" vs. "256QDfar", as seen by comparing rows "Num 6" with "Num 7". Instead of the usual quicker response for "near" IO requests, the opposite occurs and the average response for a "far" response is actually over 12 times faster than a "near" response, 97 ms compared to 1200 ms. This reversal is a dramatic example that the present invention addresses and solves, as can be seen by comparing rows "Num 6" with "Num 7" in Table A, which uses the method of the present invention. The performance for 256QDnear in Table A compared to the traditional rebuild of Table B is much better, with an average response of 16 ms compared to 1200 ms, a decrease of 98.7%, or 75 times faster (1200/16). Likewise throughput increases dramatically from 0.69 MB/s in Table B to 7.99 MB/s in Table A, an increase of over an order of magnitude difference, over 11 times better. Similarly, comparing row "Num 7" in Table A with row "Num 5" in Table B shows that even under a heavy load, the response time using the present invention of 20 ms is superior to the response time under a moderate load of 80 ms using a traditional rebuild process.

From Tables A and B one can see that under light or no loads and small Queue Depths, the method of the present invention confers practically no benefits compared to a traditional rebuild. For this reason, as explained further herein, the present invention during the execution of rebuilding takes into consideration what the rebuild rate is and what the response time is, and in one preferred embodiment only executes the head-of-queue rebuild method with delay, when the rebuild rate is greater than 33% compared to a baseline or the response time is greater than 45 ms. This ensures that the present invention will operate more in the region defined by the larger numbered rows in Table A, such as rows "Num 4" to "Num 7".

Figure 2:
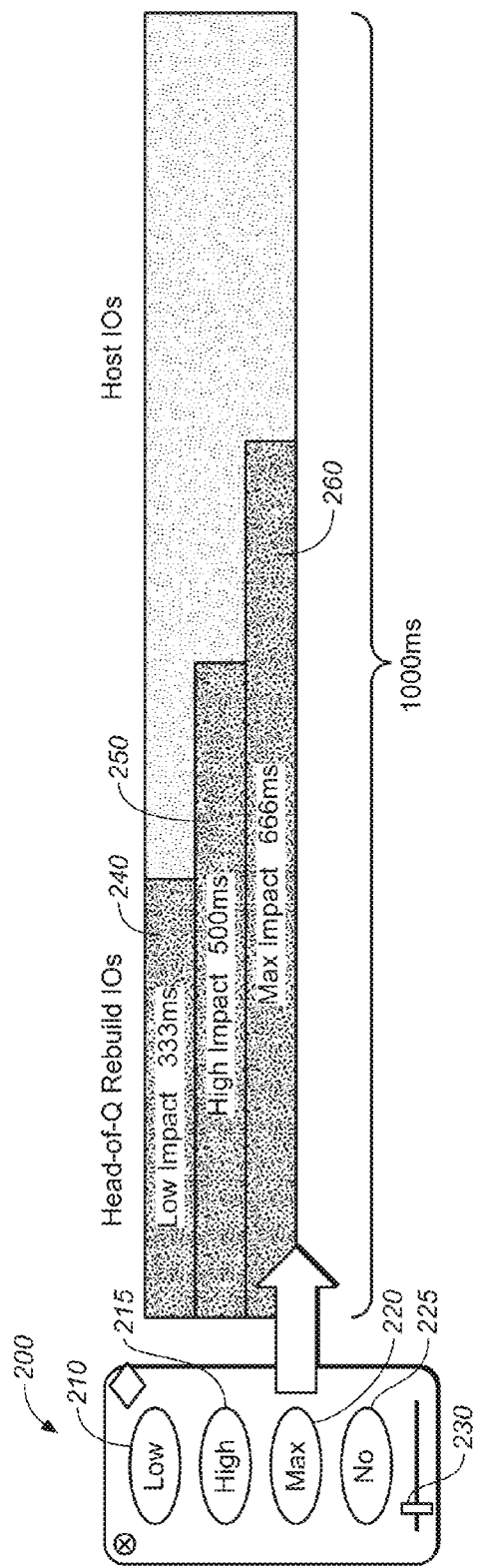
FIG. 2 is a depiction of the user-definable or configurable rebuild rate, of rebuild-to-host IOs.

Turning attention now to FIG. 2, there is depicted a user-definable or configurable rebuild rate, showing how it may be chosen via a Graphical-User Interface (GUI) 200, though there is no need for a GUI in the present invention that is manipulated by a user, so the discussion of a GUI can be thought of as a conceptual tool to further explain how the rebuild rates operate, in a configurable, changeable manner, as in practice they may be chosen and changed automatically and/or be chosen in a fixed sequence rather than through a GUI and/or by a human operator. The GUI 200 has a number of buttons 210, 215, 220, 225 that correspond to various gradations of intensity in how a user wants to rebuild a RAID system according to the present invention, such as "Low", "High", "Max" and "No", respectively, corresponding to rebuild rates that are a low value or low impact, a high value or high impact, a maximum value or maximum impact and a no rebuild or no impact to host IO, according to the present invention. For instance, in one preferred embodiment four levels of rebuild rates are presented to the user, such as "No Impact", "Low Impact", "High Impact" and "Maximum Impact", with the impact referring to how much the host IO will be effected by the rebuild.

In a "No Impact" option the RAID system of the present invention sticks with a traditional rebuild. With this option there is the least impact to host performance by the present invention simply because it is turned off. In this option, rebuild times are not a concern to the user.

Three other options are for operation of rebuilds in accordance to the present invention. In a "Low Impact" option, the host IO performance is impacted by one-third from the "No Impact" option in the preferred embodiment shown in FIG. 2, as shown by the bar graph in FIG. 2 showing "Head-of-Q Rebuild IOs" in Low Impact take up 333 ms out of a total of 1000 ms allotted. As shown graphically in FIG. 2 at 240, the rebuild IOs, which are issued to the head of the queue, hence the indicia "Head-of-Q Rebuild IOs" in FIG. 2, are effectively given 333 ms out of 1000 ms in which to operate, and the remaining time of 667 ms is given to the firmware of the present invention to service Host IO requests, hence the indicia "Host IOs" in FIG. 2. In a "High Impact" option, at 250 in FIG. 2, the present invention rebuild IOs operate for an effective time of 500 ms, or about half the time, 500 ms out of 1000 ms, with rebuild IOs issued to the head of the queue, with the remaining time devoted to host IOs. In a "Max Impact" option, at 260 in FIG. 2, the present invention issues rebuild IOs to the head of the queue for effectively 666 ms out of 1000 ms, or 67% of the time, with the remaining 33% of the time given to servicing host IOs. Rebuild IOs are not issued all at once for the specified intervals, but are interspersed with host IOs. Rebuild IOs are issued with appropriate delay to honor the expected rebuild rates and achieve the effective service times.

Though in FIG. 2 only four option buttons are shown that give discrete, step-wise gradations in performance, any number of options may be given. In fact, a user may use a slider bar such as shown by slider 230 to set the rebuild rate, or user set rate, from zero percent to a maximum percent. Further the rebuild rate may be set automatically using an artificial intelligence agent, based on historical data such as time of day, past experiences doing rebuilds, manufacturer's data and the like.

Figure 3:
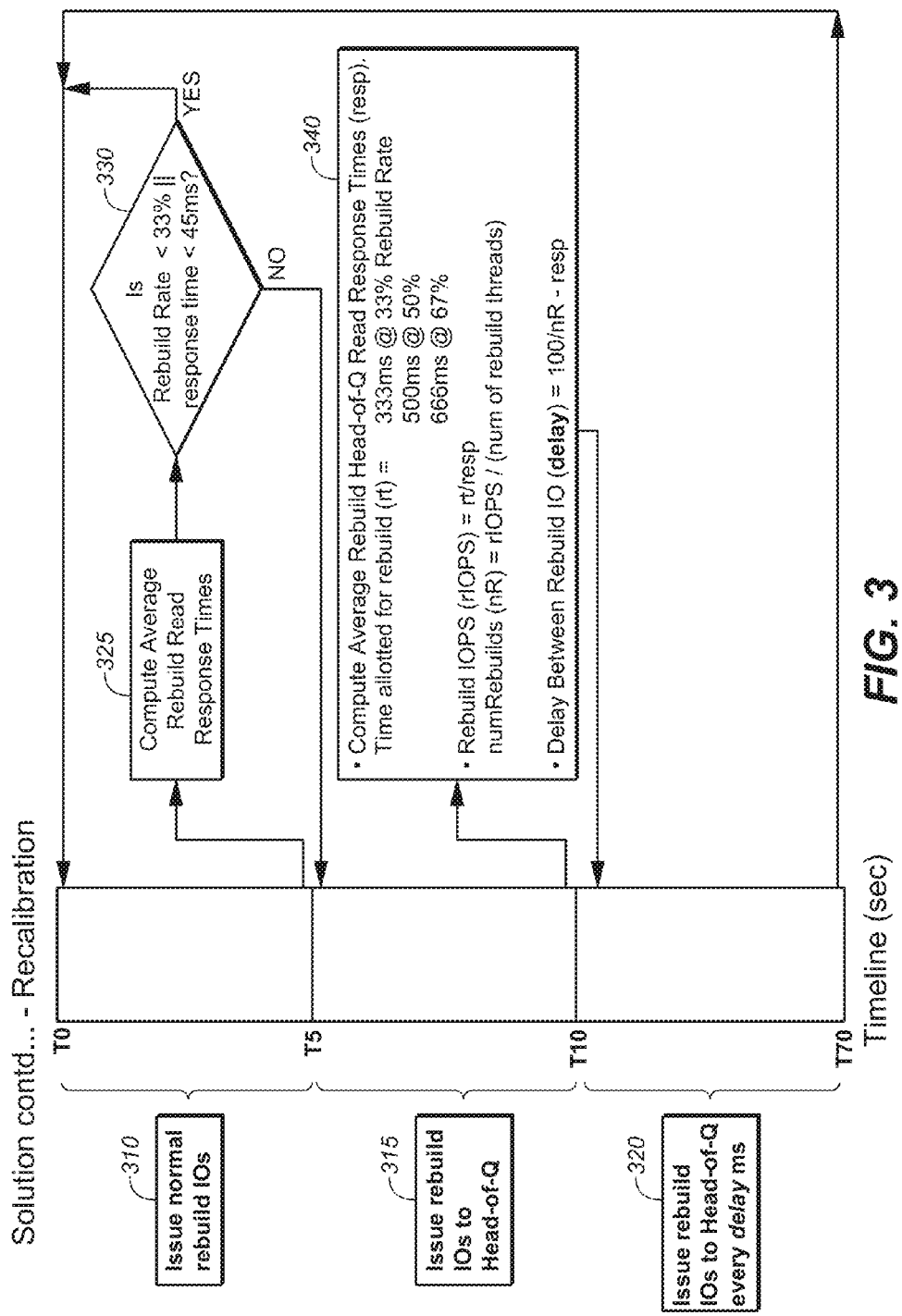
FIG. 3 is a more detailed flowchart showing a preferred embodiment of the present invention in operation.

Turning attention now to FIG. 3, there is shown a more detailed flowchart showing a preferred embodiment of the present invention in operation. The flowchart of FIG. 3 shows how calibration, recalibration and rebuild works, cycled through a timeline of zero to 70 seconds, hence the indicia indicating a timeline of T0 through T70, in stage one from T0 to T5, stage two from T5 to T10, and stage three from T10 to T70. The method of the present invention as shown in FIG. 3 is divided into three stages, in total consisting of 70 seconds, though in general any duration may be chosen in accordance with the teachings herein. The first stage 310, labeled "Issue normal rebuild IOs" is a measurement stage lasting for five seconds, from T0 to T5. The second stage 315, labeled "Issue rebuild IOs to Head-of-Q", lasting 5 seconds from T5 to T10, is a computation of the delay Delta (or T) in ms needed to be made in-between issuing rebuild IOs requests to the head-of-queue, in order to mitigate rebuild latency, as explained earlier herein. The delay takes into consideration parameters such as head response times, time allotted for rebuild, and the number of rebuild threads. The final stage, the third stage 320, labeled "Issue rebuild IOs to Head-of-Q every delay ms", lasts for 60 seconds, from T10 to T70, and implements the delay calculated in the second stage by issuing rebuild IOs to the head-of-queue every Delta ms, with the calculated delay Delta being the time the execution of the rebuild IOs are delayed from being issued to the front (head) of the queue. Then the cycle repeats itself. In this way the method of the present invention is dynamically recalibrating reissue IOs in accordance with the parameters provided in a heuristic manner.

Thus in stage one, T0 to T5, which may be five seconds out of the total period of 70 seconds or 5/70=7% of the total period, the firmware, hardware and/or software operating a drive in the RAID system in accordance with the present invention, hereinafter "firmware" for shorthand, will compute the average rebuild read response times as indicated in box 325 in FIG. 3, labeled "Compute Average Rebuild Read Response Times", when such rebuilds are done according to traditional methods, that is, a rebuild using traditional techniques not involving the present invention, termed normal rebuild IOs, as indicated in the box "Issue Normal Rebuild IOs" 310. Next, as indicated in decision box 330 labeled "Is Rebuild Rate<33%||Response Time<45 ms?", the firmware will check to see if, under this traditional rebuild, whether the rebuild rate is less than 33% indicating user has requested no impact to host IO requests, or the rebuild latency is below 45 ms, which indicates that the traditional rebuild method is optimal for the system. If true the firmware continues as shown by the decision branch "Yes", and the process will repeat stage one until such time that a "No" (false) condition is met for decision box 330, at which point the process shall move to stage two, T5 to T10.

In the next stage, stage two, T5 to T10, which may be five seconds out of the total period of 70 seconds or 5/70=7% of the total period, the firmware will compute the optimal delay needed in-between rebuild IO commands in the queue in order to prevent rebuild IO starvation/high latency of rebuild IOs, as discussed herein. To do this, the firmware computes a variety of parameters from the actual environment it is in, computing the average rebuild Head-of-Queue read response times over the full interval of stage two, and taking this average at the end of stage two, as shown by box 340 in FIG. 3. A plurality of factors goes into this calculation as explained herein.

First, the average read response times of the hard drive heads is computed for five seconds, as the system issues rebuilds to the head of queue, and is read as a parameter by the firmware. The queue is a known in the art technique of storing rebuild IOs and host IOs in a queue for a particular drive in the RAID system, with rebuild IO requests going to the head (the front) of the queue, hence "Head-of-Q" in FIG. 3. Rebuild IO requests are sent to a queue along with host IO requests, and delay added between rebuild IO requests, with a default delay of either 100 ms initially chosen, or, if the process has repeated in a previous 70 second cycle, the previous delay calculated at this second stage. The read response of the hard drive heads is read by the firmware and averaged during this stage. This averaged parameter is called "resp" in FIG. 3 at box 340, Labeled "Compute Average Rebuild Head-of-Q Read Response Times (resp)".

Second, the Rebuild Profile is determined and the time allotted for rebuild is ascertained compared to the total time for rebuild including both host IO and rebuild IO requests. If the user and/or the system has selected "Low", as described previously, with a 33%-65% rate, then this parameter is chosen for the variable "Time Allotted For Rebuild (rt)", with "rt" in ms for the various Rebuild Profile options equal to: (1) 333 ms at 33%-65% Rebuild Rate (the Low option); (2) 500 ms at 66%-98% Rebuild Rate (the High option); and (3) 666 ms at 99%-100% Rebuild Rate (the Max option). The values of these numbers is implementation specific, and, as discussed herein, can be any number of values, not just three, chosen in either a stepwise gradation or even in a continuous manner from a minimum to a maximum value.

Third, the Rebuild IOPS (rIOPS) is computed, as indicated in box 340 in FIG. 3, according to the following formula:

$$\text{Rebuild IOPS (rIOPS)} = rt/resp$$

with rt=Time Allotted for Rebuild found in the prior step, and resp=average rebuild Head-of-Queue read response, as discussed above.

Fourth, the parameter numRebuilds (nR) is computed from the Rebuild IOPs divided by the number of rebuild threads in the RAID system under consideration, num of (rIOPS) rebuild threads in FIG. 3 at box 340, according to the following formula:

$$\text{numRebuilds (nR)} = rIOPs/(\text{num of rebuild threads})$$

Finally at the end of the second stage from T5 to T10, the actual delay to be deployed between rebuilds is computed according to the formula:

$$\text{Delay, DELTA (or } T\text{), between rebuild IO} = 1000/nR\text{-}resp$$

Where 1000 is a time constant in ms. Any number can be chosen for the time constant; as IOPS is per second, a good constant to use is 1000 ms which is one second. However if this constant is changed, then rIOPS needs to be changed as well, as can be appreciated by one of ordinary skill from the teachings herein. Hence the stage two computation from T5 to T10 shown in FIG. 3. can be done over any other time interval as well.

And where: nR is numRebuilds as above, and resp=average rebuild head-of-queue read response time, as discussed above.

Once the time delay DELTA (or T) is computed, the method of the present invention proceeds to the third stage, from T10 to T70, representing 60 seconds of time, where the actual delay DELTA computed previously is used to delay rebuild IOs issued to the head of an individual drive queue of a RAID system, comprising rebuild IOs and host IOs. Every rebuild IO is delayed by the firmware by a delay DELTA before the rebuild IO request is issued to a drive. Using such a delay in the queue confers the benefit of cutting down on host IO starvation, as explained herein. At the end of the period, at T70, the calibration begins anew at time T0 and the process repeats. In this way the present invention is heuristic and opportunistic, taking into consideration the actual state of the hardware as it changes over time when computing delay.

The method of operation and apparatus of the present invention as described herein can be used with any RAID Level from RAID 1 to RAID 6, including RAID Levels 2, 3 and 4, and, can be used in hybrid RAID systems as well as new types of fail safe and redundant storage using erasure codes and the like. Furthermore, the method and apparatus of the present invention may be employed in copyback operations, or any mission critical process that needs to be employed by a RAID controller, where the process needs to issues IOs to the physical drives, and must complete in a predictable fashion, with manageable impact to host IOs, such as but not limited to media scans, consistency checks, initializations, formatting and the like.

Modifications, subtractions and/or additions can be applied by one of ordinary skill from the teachings herein without departing from the scope of the present invention. Further, though numerous features of the present invention are disclosed, a subset of these features may be employed in a stripped-down version of the present invention. The scope of the invention is thus Limited solely by the claims.

It is intended that the scope of the present invention extends to all such modifications and/or additions and that the scope of the present invention is Limited solely by the claims set forth below.

We claim:

1. A storage system having a plurality of drives for improved RAID rebuilds, comprising:
   firmware to determine an average rebuild IO response time of a drive in the storage system;
   a queue internal to the drive comprising rebuild IOs and host IOs requests;
   firmware to delay issuance of rebuild IOs to the queue;
   firmware to calibrate the delay according to the parameters of average rebuild response times from the queue, a time allotted for rebuild compared to a total time and a number of rebuild threads; and
   firmware to issue rebuild IOs to the queue using a SCSI IO tag head-of-queue if the average rebuild response time exceeds a threshold.

2. The invention according to claim 1, further comprising:
   firmware having a rebuild rate that specifies how quickly the firmware is to rebuild, the rate having a minimum and a maximum value, with host IOs prioritized more over rebuild IOs at the minimum value versus the maximum value.

3. The invention according to claim 2, wherein:
   the rebuild rate in the firmware being configurable, allowing the firmware to have rebuild rates that vary between several predetermined values ranging from the minimum to the maximum values.

4. The invention according to claim 1 wherein:
   the firmware to calibrate the delay is configured to calibrate the delay according to further parameters selected from the group consisting of read response times, time allotted for rebuild, user-selected Rebuild IO Profile, and configurable Rebuild IO Profile.

5. The invention according to claim 4, further comprising:
   firmware to issue rebuild IOs to the head of the queue in a periodic manner, having a plurality of stages comprising the period, comprising a first stage that proceeds to rebuild by issuing rebuild IOs in a traditional manner in the queue, without the introduction of the added delay, a second stage that is reached when at least one of a rebuild rate and response time are less than predetermined values for rebuild rate and response time, with the computation of the delay T occurring during the second stage, and a third stage for issuing rebuild IOs to the queue at the front of the queue every T ms.

6. The invention according to claim 5, wherein:
   the second stage computes the delay T according to the equation:

$$T = C/nR - resp$$

where:
   nR=rIOPS/num rebuild threads
   rIOPS=rt/resp
   where:
   "num rebuild threads"=number of rebuild threads in the RAID system,
   rt=the time allotted for rebuild compared to the total time (C),
   resp=the average head of queue rebuild read response times at the head of the queue, and,
   C=a time constant, the total time.

7. The invention according to claim 5, wherein:
   the firmware operates in a storage system selected from the group consisting of RAID 1, RAID 2, RAID 3, RAID 4, RAID 5, RAID 6, hybrid RAID levels 1 through 6 that include RAID 0, storage systems having copyback operations, and storage using erasure codes.

8. A method for RAID rebuilds for a plurality of drives in a storage system comprising the steps of:
   determining average rebuild IO response times in a RAID system operating rebuilds;
   computing a delay by which to delay issuance of a rebuild IO to the head of queue of a drive in the RAID according to parameters of average rebuild response times from the queue, a time allotted for rebuild compared to total time and the number of rebuild threads; and,
   issuing rebuild IOs to the queue using a SCSI IO tag head-of-queue if the average rebuild response time exceeds a threshold and delaying execution of the rebuild IOs by the delay.

9. The method according to claim 8,
   wherein the delay is computed according to further parameters selected from the group consisting of read response times, time allotted for rebuild, user-selected Rebuild IO Profile, and configurable Rebuild IO Profile.

10. The method according to claim 8, further comprising the steps of:
    selecting the time allotted for rebuild from a minimal rebuild rate to a maximum rebuild rate.

11. The method according to claim 10, further comprising the steps of:
    selecting the time allotted for rebuild from a configurable Rebuild Profile, the selection of time allotted for rebuild in the Rebuild Profile comprising a plurality of rebuild rates ranging from the minimal rebuild rate to the maximum rebuild rate.

12. The method according to claim 8,
    wherein the delay is computed according to further parameters comprising read response times, time allotted for rebuild, user-selected Rebuild IO Profile, and configurable Rebuild IO Profile.

13. The method according to claim 12, wherein:
    the steps of determining average rebuild IO response times, computing delay for the queue, and issuing rebuild IOs to the queue occurs in a periodic manner in the RAID storage system.

14. The method according to claim 13, wherein:
    the periodic manner of steps comprises a first stage which proceeds to rebuild the RAID storage system by issuing rebuild IOs in a traditional manner in the queue, without issuing the rebuild IOs to the head of drive queue, a second stage that is reached when at least one of a rebuild rate and response time are greater than predetermined values for rebuild rate and response time, with the computation of the delay T in ms occurring during the second stage, and a third stage for issuing rebuild IOs to the head of drive queue every T ms.

15. The method according to claim 14, wherein:
    the method is used in a storage system selected from the group consisting of RAID 1, RAID 2, RAID 3, RAID 4, RAID 5, RAID 6, hybrid RAID levels 1 through 6 that include RAID 0, storage systems having copyback operations, and storage using erasure codes, storage systems employing issuing IOs to physical drives, storage systems involving media scans, storage systems involving consistency checks, storage systems involving initializations, and storage systems involving formatting.

16. An apparatus for RAID rebuilds for RAID rebuilds under host IO conditions comprising:
    means for measuring rebuild IO responses in a RAID storage system;

means for queuing for storing rebuild IO and host IO requests for said RAID storage system;

means for computing a delay to delay issuance of said rebuild IO requests to the head of said queue comprising a delay time in milliseconds;

means for issuing rebuild IOs to head of said queue and delaying the execution of the rebuild IOs by said delay time;

means for setting a rebuild rate for said RAID system;

said RAID storage system means for measuring rebuild IO responses, means for computing delay and means for issuing rebuild IOs operate in a periodic manner, wherein, said means for measuring rebuild IO responses in a first time period computes the average rebuild response times of the RAID system when operating in a traditional manner, until such time either one of the response rate of the RAID system and the response times of the RAID system rise above predetermined values;

said means for computing a delay in a second time period computes the optimal delay by computing the average rebuild response time when said RAID system is operating with said delay instructions added to head of said drive queue, the rebuild rate of said means for setting a rebuild rate, and the number of threads in said RAID system; and, said means for issuing rebuild IOs delays issuance of a rebuild IO request in a third time period to head of said drive queue by said optimal delay computed in said second time.

17. The apparatus according to claim 16, wherein:

said means for computing a delay in a second time period computes the optimal delay T according to the equation:

$$T = C/nR - resp$$

where:

nR=rIOPS/num rebuild threads rIOPS=rt/resp where:

"num rebuild threads"=number of rebuild threads in the RAID system, rt=the time allotted for rebuild compared to the total time (C), resp=the average head of queue rebuild read response times at the head of queue, and, C=a time constant, the total time.

* * * * *